Nov. 1, 1955  E. F. HUSTON  2,722,667
CABLE CONNECTORS
Filed Nov. 15, 1951  4 Sheets-Sheet 1
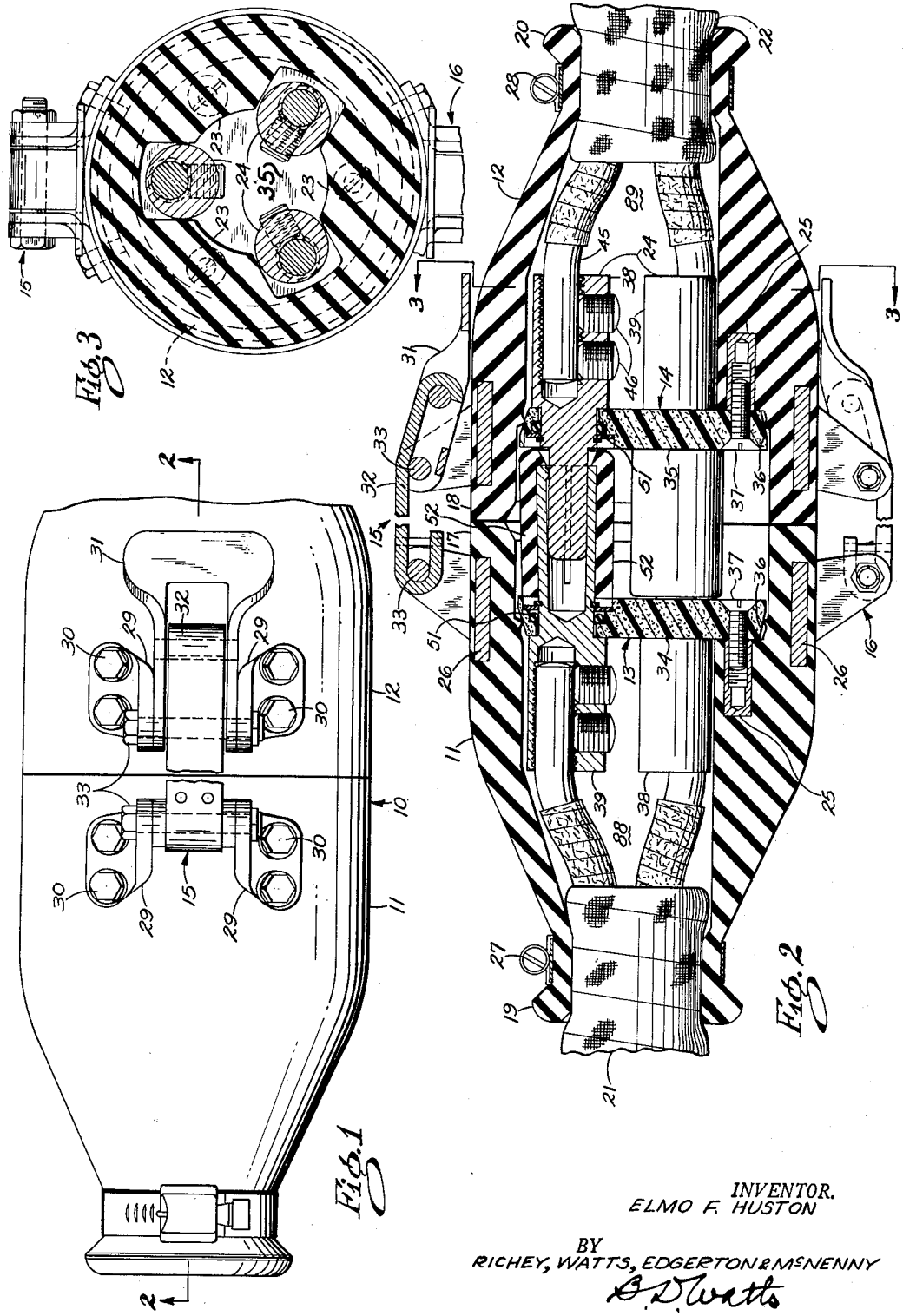
INVENTOR.
ELMO F. HUSTON
BY
RICHEY, WATTS, EDGERTON & McNENNY
*B.D.Watts*
ATTORNEYS Nov. 1, 1955 E. F. HUSTON 2,722,667
CABLE CONNECTORS
Filed Nov. 15, 1951 4 Sheets-Sheet 2
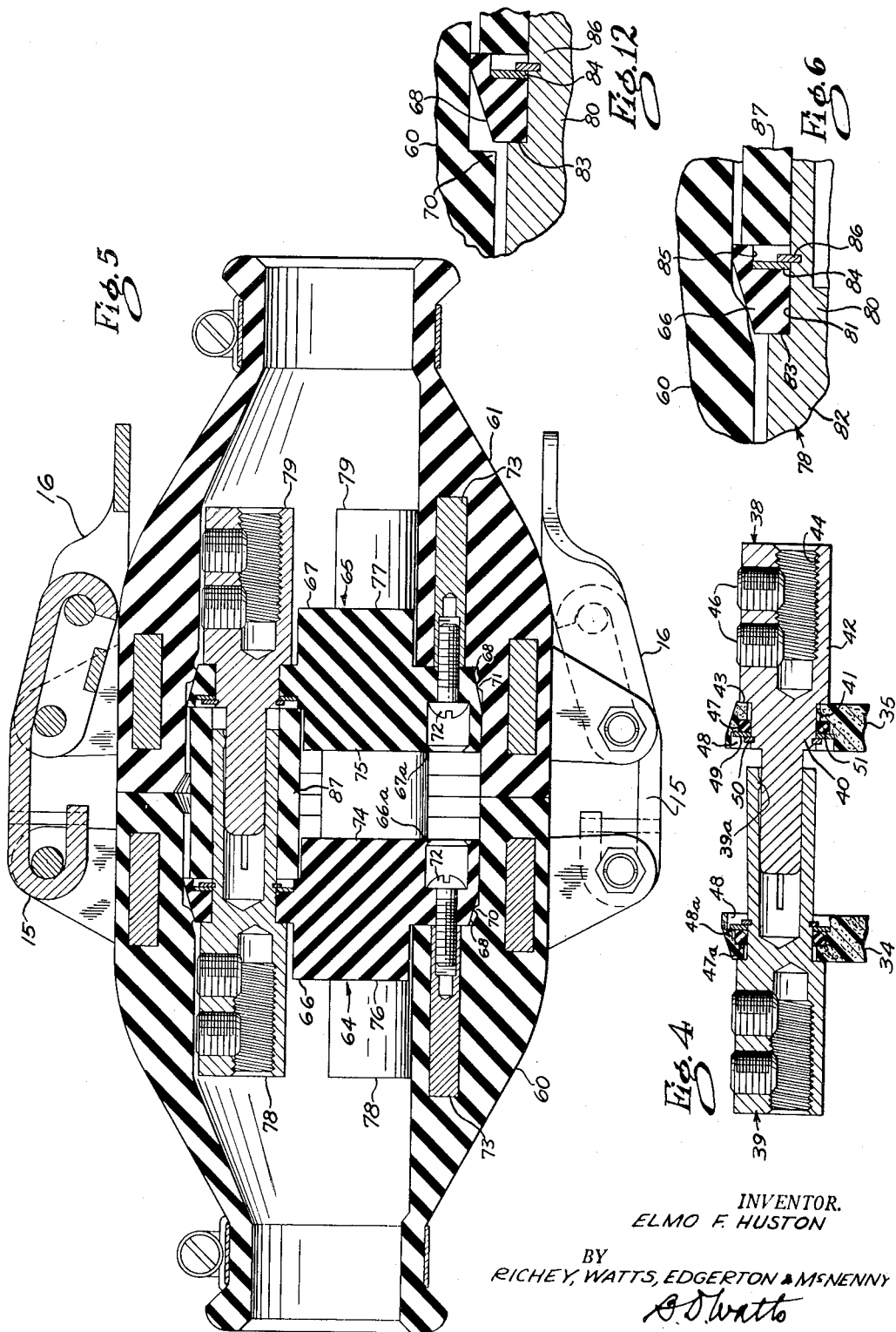
INVENTOR.
ELMO F. HUSTON
BY
RICHEY, WATTS, EDGERTON & McNENNY
A.D.Watts
ATTORNEYS Nov. 1, 1955     E. F. HUSTON     2,722,667
CABLE CONNECTORS
Filed Nov. 15, 1951     4 Sheets-Sheet 3
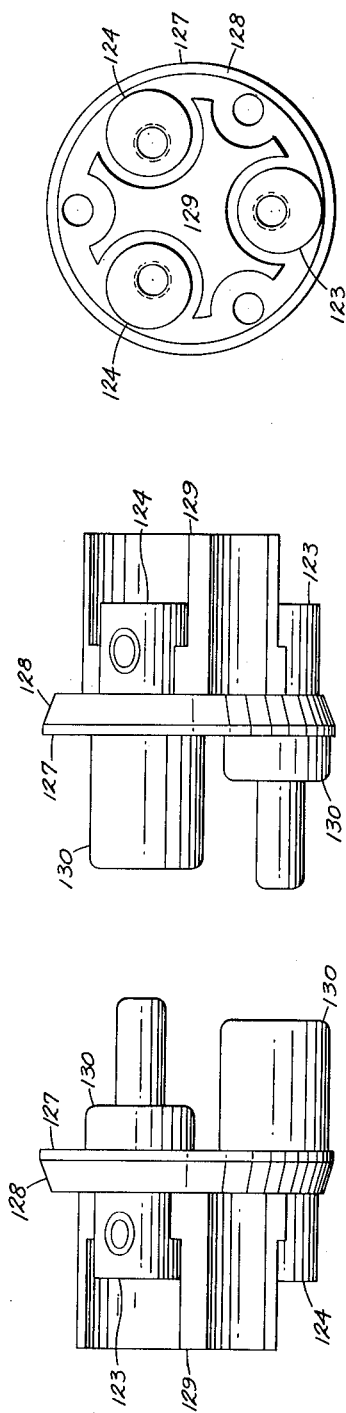
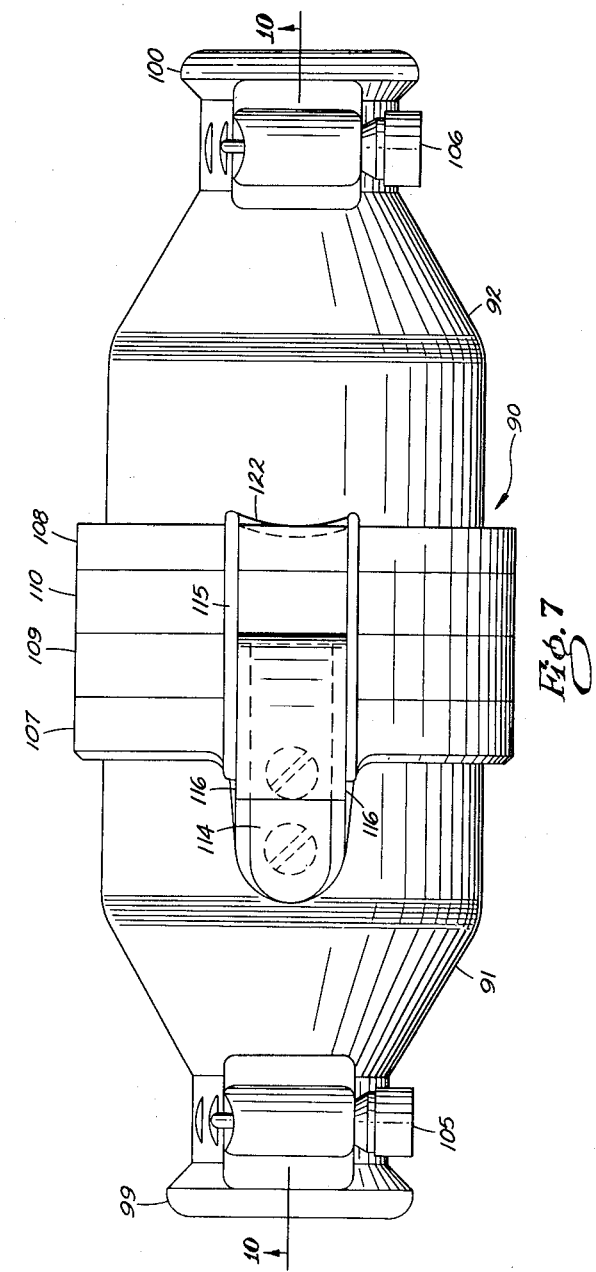
INVENTOR.
ELMO F. HUSTON
BY
RICHEY, WATTS, EDGERTON & McNENNY
ATTORNEYS

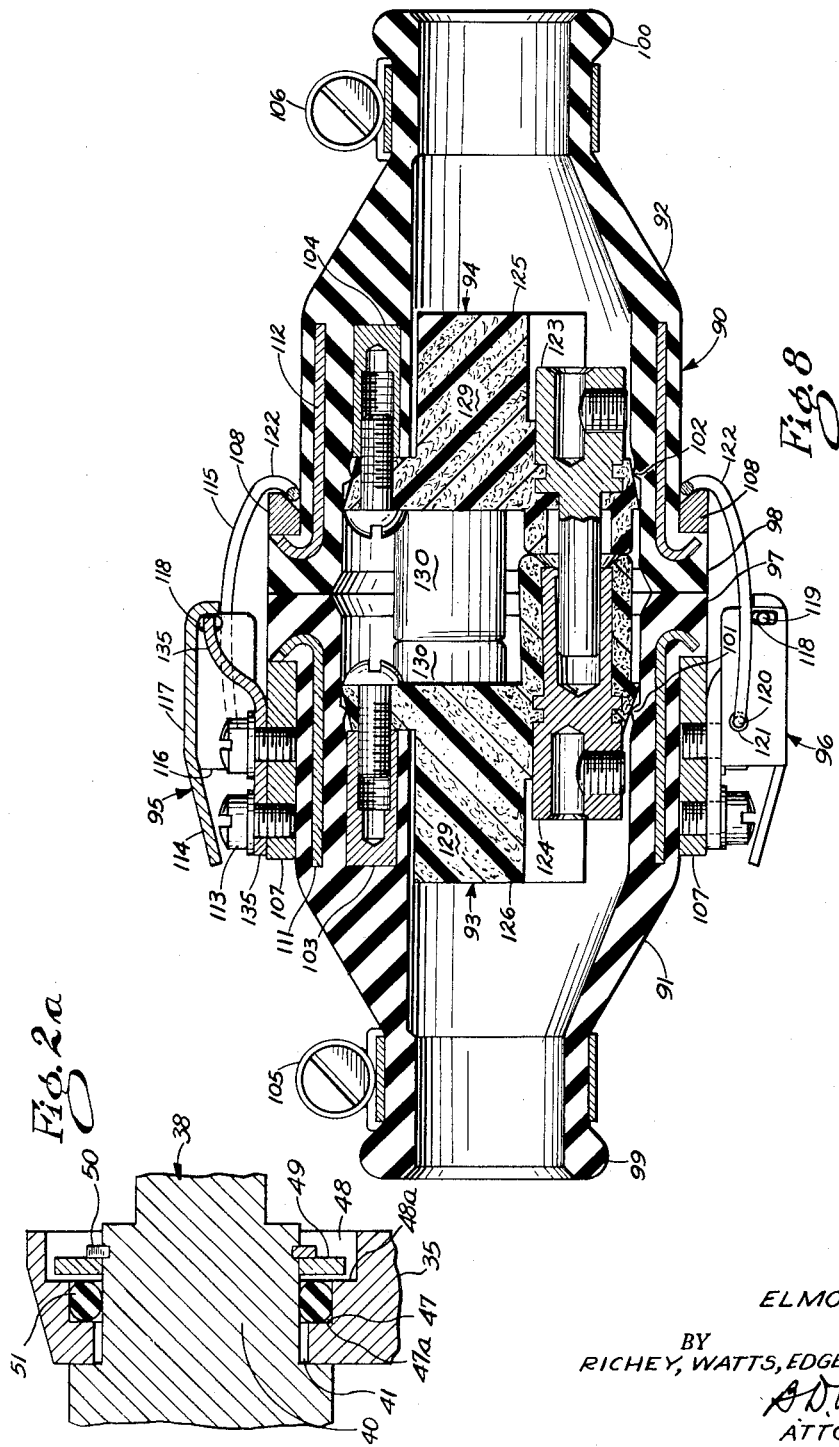

United States Patent Office 2,722,667
Patented Nov. 1, 1955

2,722,667

CABLE CONNECTORS

Elmo F. Huston, Mansfield, Ohio, assignor to The Ohio Brass Company, Mansfield, Ohio, a corporation of New Jersey Application November 15, 1951, Serial No. 256,579

16 Claims. (Cl. 339—60)

This invention relates to electric connectors and more particularly to a connector for cable ends which is waterproof and suitable for use in mines and the like.

A primary object of the invention is the provision of a two-part connector for cable ends which shall be impervious to water but which may be quickly and easily joined or separated.

An object of the invention is the provision of a connector formed of a rubber-like or deformable material and suitable for carrying electrical and mechanical loads of a relatively large order.

An object of the invention is the simplification of manufacture of connectors of the aforementioned type.

An object of the invention is the provision of a waterproof cable connector which may be simply and easily installed in the field.

An object of the invention is the provision of a cable connector which shall be sufficiently flexible to withstand severe field conditions, yet have mechanical strength and rigidity to satisfy electrical requirements.

These and other objects, features and aspects of the invention will be more readily apparent from a consideration of the following detailed specification and appended claims, taken in connection with the accompanying drawings, in which:

Fig. 1 is a top view of the preferred embodiment of the connector of the invention;

Fig. 2 is a longitudinal sectional view thereof taken on the direction 2—2 of Fig. 1;

Fig. 2a is an enlarged, fragmentary, sectional view of a water-tight but flexible connection between a plug and a support member of the Fig. 2 connector;

Fig. 3 is a transverse sectional view thereof, taken in the direction 3—3 of Fig. 2;

Fig. 4 is an enlarged sectional view of the contacts of the connector of Fig. 2;

Fig. 5 is a longitudinal sectional view of a connector embodying an alternate form of contact supports and mode of attaching the contactors thereto;

Fig. 6 is an enlarged view showing certain details of Fig. 5;

Fig. 7 is a top view of an embodiment of the connector showing an alternate form of clamp;

Fig. 8 is a longitudinal sectional view of the connector of Fig. 7 and showing another form of contact support structure;

Figs. 9, 10 and 11 are views of the contact assembly of the connector of Figs. 7 and 8; and Fig. 12 is an enlarged, fragmentary, sectional view of the Fig. 5 connector, showing parts just before they are sealingly engaged with each other.

Referring now to the drawings, the general arrangement and structure of the connector of the invention will be apparent particularly from Figs. 1, 2, 3 and 4. The connector 10 comprises two body members 11 and 12 including associated contact assemblies 13 and 14 and connecting devices 15 and 16. The body members are of annular cross section and vary along the length of the central or inner end portions 17 and 18 to the relatively constricted outer end portions 19 and 20, which receive the cables 21 and 22.

The body members 11 and 12 comprise the outer casing of the connector and are molded or otherwise formed of a tough rubber-like material including any synthetic or natural rubber so as to have a high mechanical strength to withstand damage due to mechanical abuse or chemical attack while having a relatively high insulation factor so as to prevent leakage or breakdown due to electrical potential. The members are formed with inner projections or shoulder portions 23 (Fig. 3), so as to receive the contactor elements 24 and position the cable leads. Metallic inserts 25 are provided and bonded in place in the body members for securing the contact assemblies 13 and 14 to said body members, while other metal inserts 26 are similarly bonded in place in the said members for the clamping devices 15 and 16. Hose clamps 27 and 28 serve to constrict the outer end portions of the body members and form sealed water-tight connections with the cables 21 and 22.

The upper connecting device 15 is shown in top view in Fig. 1 and in sectional view in Fig. 2 and includes two bracket members 29 secured to the body members and the inserts 26 by means of cap screws 30. Each connecting device includes a lever or handle member 31 forming a clamping means and a member 32, forming an engaging means, mounted upon pivots 33 which are supported by bracket members 29. The length of the clamping member 32 is such that the inner end portions 17 and 18 of the body members are in compressive water-tight engagement when connected by the devices. The devices are self-locking so as not to open while the device is in use. The lower connecting device 16 is identical with the upper device 15.

The contact assemblies 13 and 14 comprise support members 34 and 35 and three sets of contact elements 24 spaced equally about the circumference of the support member. In the embodiment of Fig. 2, the support members 34 and 35 are formed as flat circular plates, each having tapered side walls 36 for engagement with inner annular abutment portions of the body members 11 and 12, the entire assembly being clamped into position by screws 37 which fit into the inserts 25. The contact assemblies may include any suitable disposition of male and female contact elements about the circumference of the support member, the contact elements being disposed so as to permit joining of the connector portions in only one way.

The cross sectional view of Fig. 2 and the enlarged view of Fig. 4 show the construction and disposition of a typical contact pair 24 comprising a male contact 38 and a female contact 39. The female contact 39 is split lengthwise and is provided with a lug 39a to engage male contact 38 to assure tight contact at all times between the parts. The male contact 38 comprises a body of copper or similar suitable contact material and is formed with a shank portion 40 which is fitted through an opening 41 in the support member 35. An enlarged end portion 42 of the body of the contact element forms a shoulder 43 which engages the support member while an axial opening 44 is adapted to receive a conductor 45 of the cable. Axial opening 44 is threaded to provide for better contact between conductor 45 and contact element 38. Set screws 46 serve to clamp the conductor securely in position and to insure firm electrical connection between the conductor and the contact.

Associated with the opening 41 are recesses 47 and 48 formed in the body of the member 35 and successively larger in diameter than the opening 41 and defined in part by two spaced annular inner walls 47a and 48a. The outer recess 48 receives a washer 49 which, together with a snap ring 50 holds the contact 38 in position with respect to the support member. A sealing means is incorporated in the recess 47, as for example, an O-ring 51 as illustrated in the embodiment of Figs. 2 and 2a and Fig. 4. Ring 51 is sealingly deformed radially between body 35 and shank portion 40 and is of width in this deformed state approximating the distance between the inner walls 47a and 48a. Thus, ring 51 is subject to deforming forces delivered only in a direction substantially radially of shank portion 40 but said ring is retained in recess 47 and in sealing relation to member 35 and contact 38 without the permanent set-producing forces delivered axially of the shank portion in accordance with prior practice. Washer 49, having a substantially plane radially disposed surface for engaging ring 51, is stopped from motion toward said ring by wall 48a to produce this new sealing ring-retention result. The sealing means may also constitute a compressed gasket of rubber or similar material which will not only seal the members against the passage of water, but provide mechanical support for and stabilize the contact 38 with respect to the support member 35. The mounting of the female contact 39 corresponds to that of the male contact 38.

The opening 41 is larger in diameter than the shank 40 of the body of the contact while the diameter of the recess 48 is greater than that of the washer 49. The contact 38 is thus free to slide a limited extent, subject to restraint by O-ring 51, in any direction or may move angularly with respect to the normal axis perpendicular to the support member 35. The female contact is covered with a cylindrical sleeve 52 of suitable insulating material and serves to protect the end of the contact mechanically as well as to prevent the possibility of short circuits while in use.

Referring now to Fig. 5, there is shown an alternative embodiment of the invention. The connector of Fig. 5 comprises two body members 60 and 61, formed generally in the same fashion as the body members 11 and 12 of Fig. 2 and joined by two clamps 15 and 16 as in Fig. 2. The contact assemblies 64 and 65 differ in design from those of Fig. 2 but are similar in that the support members 66 and 67 are formed with tapered side walls 68 and 69 which engage the projecting pieces 70 and 71 of the inside walls of the body portions 60 and 61. Abutment portions 70 and 71 are like those of the Fig. 2 connector bodies 11 and 12 and are, according to my preference, substantially square for maximum sealing pressure and deformation. The extent of this deformation will vary with the softness of the rubber of the body and other factors, but in accordance with the drawings hereof the most noticeable difference in abutment deformation in the present embodiments attributable to the use of a relatively soft rubber support member 66 in one instance and a relatively hard and rigid support member 34 in the other instances (Fig. 2). The contact assemblies are secured (to the body member) by screws 72 and inserts 73, the latter being molded into the body member after the fashion of inserts 25 of Fig. 2.

The structure of the contact supports 66 and 67 will be apparent from the cross sectional view of Fig. 5. The supports are formed with inwardly extending projections 74 and 75 and outwardly extending projections 76 and 77. These projections act as insulators and spacers and add to the strength and rigidity of the structure. The contact supports may be fabricated or molded of any of various materials known in the electrical art which combine high electrical and mechanical strengths with low coefficients of moisture absorption. The supports 66 and 67 are provided with openings to receive screws 72 and have lips 66a and 67a restricting the entrance to these openings whereby the said screws are retained resiliently in the said supports.

The contact assemblies comprise a set of three contact elements supported by the support member 66, contacts being shown at 78 and three supported by the support member 67, two of the contacts being shown at 79. The male and female contact elements may, of course, be alternated to provide a polarizing relationship between the two portions of the connector. As shown particularly in Fig. 6, the contact members include a shank portion 80 which is inserted in an opening 81 in the support member. An enlarged end portion 82 forms a shoulder 83 which abuts the body of the support member 66 while a washer 84, which is fitted in a recess 85, cooperates with a snap ring 86 to secure the contact. A cylindrical sleeve 87 covers the female contact 78 and also abuts against the support members 66 and 67 to increase the strength and rigidity of the structure.

The advantageous features of the invention will now be made more apparent by reference particularly to Fig. 2. It will be seen that by reason of the tapered wall structure 36 of the contact support discs and the cooperating wall portions of the body members, the inner portions, designated as 88 and 89, are made water-tight even though the two portions of the connector are separated. This result is achieved while utilizing a contact support structure which enables a sufficient amount of flexibility of contact support to permit alignment of the contacts during joinder of the two portions of the connector and, further, in the utilization of unitary body members 11 and 12 which permit an adequate seal between the ends 19 and 20 and the cables 21 and 22. Finally this result is secured while utilizing a composite structure adapted to facilitate production processes.

Referring now to Figs. 7 and 8, there is shown a modified form of the invention utilizing a molded unitary contact assembly and a novel connecting means for the portions of the connector. The connector 90 comprises two body members 91 and 92, contact assemblies 93 and 94, and clamp assemblies 95 and 96. The body members 91 and 92 are of an elongated annular form having inner end portions 97 and 98 and constricted outer end portions 99 and 100, generally similar to the body members of the embodiments of Figs. 2 and 5. Two inwardly projecting pieces 101 and 102, like the pieces 70 and 71 of the Fig. 5 bodies, are provided in members 91 and 92 for sealing engagement with the contact assemblies. Metallic inserts 103 and 104 are provided in bodies 91 and 92 for engagement with and support of contact assemblies 93 and 94. Ring clamps 105 and 106 provide means for sealing the outer end portions of the body members against cables with which the connector is to be associated.

The alternate assembly for connecting the two body members includes two annular metallic members 107 and 108 surrounding the body members and bearing upon inner end portions 97 and 98. Metallic inserts 111 and 112 having an arcuate end portion extending into the shoulders are molded into the body members and insure a proper distribution of force under the compressive action of the clamps. A support piece 135 is secured to the annular member 107 by cap screws 113 and serves as a support for a lever member 114 and engagement members 115. The lever or handle member 114 is formed with two side portions 116 disposed perpendicularly to and upon either side of a central portion 117. Openings 118 receive projections 119 extending from the support piece 135, the projections serving as pivots for the lever member. The clamping members 115 are suitably formed of spring steel wire or the like and have the open ends 120 engaged in openings 121 in the clamping member and the closed end 122 bent for engagement with the clamping ring 108. It will be apparent that a positive and uniform clamping action will be exerted upon the inner ends 97 and 98 of the body members around the entire circumference thereof by this arrangement.

The structure of the contact assemblies 93 and 94 may be understood with reference to the views of Figs. 8, 9, 10 and 11. The male and female contact elements 123 and 124 are essentially similar to the contact elements of Figs. 2 and 5, but are supported by insulating members 125 and 126. The contact members are molded into the insulating member in a manner well known in the art so as to form an integral assembly. As shown particularly in Figs. 9, 10 and 11, the integral assembly includes a plate-like central portion 127 having tapered walls 128 for engagement with portions 101 and 102 of the body members. Outwardly extending pieces 129 are formed to insulate the ends of the contact elements and to increase the mechanical strength of the assembly and also to increase the electrical leakage distance, thus decreasing flashover tendencies. Inwardly projecting portions 130 surround the contact elements, the ends of the portions bearing upon each other and serving as an additional moisture seal, when the connector is in the assembled position. Portions 130 also serve to increase the strength and rigidity of the structure and to prevent short circuits.

In reference to the matter of making the illustrated connectors and particularly the molded rubber-like body members, I have employed a novel procedure to incorporate the clamp rings or inserts in these bodies. In accordance with this procedure inserts 26 of the Fig. 2 embodiment of this invention, for instance, are mounted in place in an injection mold. These insert parts are preferably of brass to assure an excellent metal-rubber bond. If inserts of other base metal, suitably steel, are desired, I prefer to provide clean brass coatings thereon to assure the best bond. These inserts are made suitably by cutting pipe sections as rings and drilling and tapping screw holes. Then, with washers mounted on an insert ring and with the washers in register with the tapped screw holes in the ring, I screw the washers in place and hold them there during the molding operation. When the molding operation is completed, the screws are removed and the rubber body 11 or 12 is ready for application of clamp brackets. Cap screws 30 are then screwed into the insert through the washers and metal-to-metal contact providing solid anchors for the brackets is obtained in every instance.

Having thus described the present invention so that others skilled in the art may be able to understand and practice the same, I state that what I desire to secure by Letters Patent is defined in what is claimed.

What is claimed is:

1. A connector having an outer casing comprising two body members, each body member having an elongated annular wall of resilient, insulating material and having an inner and an outer end, and an inner circumferential abutment portion spaced from the inner end and a shoulder portion on the inside of the body member toward the outer end of the body member from the abutment portion, the outer end having an opening for receiving a cable, a contact assembly mounted within each body member and secured to the shoulder portion, each assembly comprising a support member of insulating material and having an axially tapered outer peripheral portion for sealing engagement with said inner abutment portion, and each support member carrying a contact adapted for axial engagement with a mating contact of a contact assembly associated with the remaining body member, means at the outer end of each of the body members for clamping the member into water-tight engagement with the cable received therein, and connecting means for securing the two body members with the inner ends thereof in compressive axial engagement comprising clamping means associated with one body member and means adapted to be engaged by the clamping means associated with the remaining body member and means imbedded in each of the body members at the inner ends thereof and cooperating with the clamping means to exert the clamping forces uniformly about the periphery of the inner ends of the body members.

2. A connector having an outer casing comprising two body members, each body member having an elongated annular wall of resilient, insulating material and having an inner and an outer end, an inner circumferential abutment portion spaced from the inner end and an adjacent shoulder portion, the outer end having an opening for receiving a cable, a contact assembly mounted within each body member and secured to the shoulder portion thereof, each assembly comprising a support member of insulating material having an axially tapered outer portion for sealing engagement with said inner abutment portion of the body member, and each support member carrying a contact adapted for axial engagement with a mating contact associated with a second contact assembly, each contact comprising a shank portion passing through an opening in the support member and having a groove receiving a snap ring for securing the contact relative to the support member, and means in the opening and surrounding the contact for sealing the opening, means at the outer end of each of the body members for clamping the member into water-tight engagement with the cable received therein, and connecting means for securing the two body members with the inner ends thereof in compressive axial engagement comprising annular members embedded in the body member at the inner ends thereof for distributing compressive forces about the periphery of the members and a clamping member attached to each of the said annular members.

3. A connector having an outer casing comprising two body members, each body member having an elongated generally annular wall of resilient, insulating material and generally symmetric with respect to a longitudinal axis, an inner and an outer end, an inner circumferential abutment portion spaced from the inner end, and a shoulder portion on the inside of the body member and toward the outer end from the abutment portion, the outer end having an opening for receiving a cable, a contact assembly mounted within each body member and secured to the shoulder portion thereof, each assembly comprising a support member of insulating material having an axially tapered outer portion for sealing engagement with said inner abutment portion of the body member, and each support member carrying a contact member extending through and beyond the support member and adapted for axial engagement at the inner end thereof with a mating contact of a contact assembly associated with the remaining body member and adapted to be connected to a cable conductor at the outer end thereof, the assembly being secured to the shoulder portion, means at the outer ends of the body member for clamping the member into water-tight engagement with the cable received therein, annular members imbedded in the body members toward the inner ends thereof, and connecting means for securing the two body members with the inner ends thereof in compressive axial engagement comprising clamping means associated with one body member and bearing against the imbedded member thereof and means associated with the remaining body member adapted to be engaged by the clamping means and bearing against the imbedded member of that body member.

4. The invention in accordance with claim 3, the said support members being of relatively rigid material and the said contact member passing through an opening in the support member, the opening being larger than the body of the contact member to permit limited relative movement between the members, and sealing means disposed between the contact member and the support member and in compressive engagement therewith.

5. The invention in accordance with claim 3, the support members being formed of a flexible rubber-like material.

6. The invention in accordance with claim 5, each contact assembly comprising a plurality of spaced contact members and the support member having a central portion extending axially between the contact members toward the outer end thereof to separate the members and cylindrical sleeves surrounding each of the contact portions of the contact members and adapted to engage a similar sleeve on the associated contact member of the remaining assembly to provide a water-tight cover for the contacting portions of the contact members when the connector is assembled.

7. In a connector, a body member comprising an outer casing and having an elongated generally annular wall of resilient, insulating material, an inner and an outer end, an inner and an outer side, and an inner circumferential abutment portion spaced from the inner end and an inwardly directed portion projecting from said abutment portion and a shoulder portion on the inside of the body member toward the outer end of the body member from the abutment portion, the outer end having an opening for receiving a cable, a contact assembly mounted within the body member, and secured to the shoulder portion the assembly comprising a support member engaged with the said inwardly directed portion and the said inner abutment portion of the body member, and the support member carrying a contact member extending through and beyond the support member and adapted for axial engagement at the inner end thereof with a mating contact of another contact assembly and adapted to be connected to a cable conductor at the outer end thereof, means at the outer end of each of the body members for clamping the member into water-tight engagement with the cable received therein and connecting means for securing the body member to a second similar body member with the inner ends thereof in compressive axial engagement comprising an annular member imbedded in the body of the member for distributing compressive forces about the entire periphery of the end of the body member, and a clamping member attached to the said annular member.

8. A connector having an outer casing comprising two body members, each body member having an elongated generally annular wall of resilient, insulating material, an inner and an outer end, an inner circumferential abutment portion spaced from the inner end and a shoulder portion toward the outer end of the body member from the abutment portion, an outwardly directed portion projecting from the outer side of the wall at the inner end of the member and annular metallic inserts extending longitudinally in the wall portion and radially into the outwardly projecting portion, and an opening at the outer end thereof for receiving a cable, a contact assembly mounted within each body member and secured to the shoulder portion, each assembly comprising a support member in compressive engagement with said inner annular abutment portion of the body member, and each support member carrying a contact member extending through and beyond the support member and adapted for axial engagement at the inner end thereof with a mating contact of a contact assembly associated with the remaining body member and adapted to be connected to a cable conductor at the outer end thereof, means at the outer end of each of the body members for clamping the member into water-tight engagement with the cable received therein, and connecting means for securing the two body members with the inner ends thereof in compressive axial engagement comprising annular members surrounding the body members and bearing against the projecting portions, and clamping means secured to one annular member and adapted to engage the remaining annular member.

9. A connector having an outer casing comprising two body members, each body member having an elongated generally annular wall of resilient, insulating material, an inner and an outer end, an inner annular abutment portion spaced from the inner end and a shoulder portion toward the outer end of the body member from the abutment portion, an outwardly directed portion projecting from the outer side of the wall at the inner end of the member, and annular metallic inserts within the wall portion extending longitudinally and radially into the projecting portion, the outer end having an opening for receiving a cable, a contact assembly mounted within each body member and secured to the shoulder portion, each assembly comprising a support member having an axially tapered outer portion for sealing engagement with said inner annular abutment portion of the body member, and each support member carrying a contact member extending through and beyond the support member and adapted for axial engagement at the inner end thereof with a mating contact of a contact assembly associated with the remaining body member and adapted to be connected to a cable conductor at the outer end thereof, means at the outer end of each of the body members for clamping the member into water-tight engagement with the cable received therein, and connecting means for securing the two body members with the inner ends thereof in compressive axial engagement comprising annular members surrounding the body members and bearing against the projecting portions, and means for clamping said surrounding annular members toward each other against the projecting shoulder portion and the inserts.

10. A connector having an outer casing comprising two elongated annular body members of resilient, insulating material, each member having an inner and an outer end, the members having complementary surfaces at the inner ends thereof disposed generally in a plane normal to the longitudinal axis of the members for joining the members, each member having an inner annular abutment portion on the inner side thereof and spaced from the inner end of the member, a disc-like member of insulating material associated with each body member, the disc-like members carrying a plurality of male and female contactors cooperatively disposed for insertion and withdrawal, the disc-like members having tapered wall portions for sealingly engaging said inner annular abutment portions of the body members, cylindrical sleeves surrounding the contactors, the length of the cylindrical sleeves surrounding the contactors being related to the position of the abutment portions of the body member so that compressive engagement of the complementary surfaces of the body members urges the disc member into firm engagement with the inner annular abutment portion of the body member, and connecting means for securing the two body members with the inner ends thereof in compressive axial engagement comprising clamping means connected to one body member and means associated with the remaining body member adapted to be engaged by the clamping means, each of the said clamping means including an annular ring imbedded in the body member toward the inner end thereof for distributing the compressive forces uniformly about the periphery of the member.

11. A contactor assembly for a two-piece connector comprising a body member, the body member comprising a flat relatively rigid piece having tapered side walls and having a plurality of spaced openings extending transversely through the member, each opening being surrounded at one end thereof by a smaller and a larger recess in the body member, contactor elements of electrically conducting material extending through the openings, each contactor comprising a shank portion of lesser cross-sectional area than the openings in the body member and an end portion forming a shoulder of enlarged cross section for bearing upon the end surface of the member opposite the recesses, and means for controlling the contactors for slight angular motion with respect to said body member comprising a rubber gasket fitted in the smaller recess and firmly engaging the body member and the contactor shank for sealing the opening, a flat washer fitted in the larger recess, the outer diameter of the washer being less than the diameter of the recess and a snap ring secured in the shank portion of the contactor body whereby the contactor is firmly positioned with respect to the body member.

12. A contact assembly for a two-piece connector comprising a body member of composite material including an organic filler impregnated with a synthetic resin, the body member comprising a flat relatively rigid piece having tapered side walls and having a plurality of spaced openings extending transversely through the member, each opening being surrounded at one end thereof by a smaller and a larger recess in the body member, contactor elements of electrically conducting material extending through the openings, each contactor comprising a shank portion of lesser cross sectional area than the openings in the body member and an end portion forming a shoulder of enlarged cross section for bearing upon the end surface of the member opposite the recesses, and means for constraining the contactors for slight angular motion with respect to said body member comprising a washer fitted in the larger recess, the outer diameter of the washer being less than the diameter of the recess and a snap ring secured in the shank portion of the contactor body whereby the contactor is firmly positioned with respect to the body member, and sealing means comprising an O-ring fitted in the smaller recess and engaging the plate member and the shank of the contactor for sealing the assembly against water.

13. A contactor assembly for a two-piece connector comprising a body member of composite material including an organic filler impregnated with a synthetic resin, the body member comprising a flat relatively rigid piece having tapered side walls and having a plurality of spaced openings extending transversely through the member, two spaced annular inner walls in each opening cooperating to define an inner recess and an enlarged diameter outer recess surrounding one end of each said opening, contactor elements of electrically conducting material extending through the openings, each contactor comprising a shank portion of lesser cross sectional area than the openings in the body member and an end portion forming a shoulder of enlarged cross section for bearing upon the end surface of the member opposite the recesses, and means for constraining the contactors for flat angular motion with respect to said body member comprising a washer fitted in the larger recess diameter, the outer diameter of the washer being less than the diameter of said larger diameter recess and a snap ring secured in the shank portion of the contactor body whereby the contactor is firmly positioned with respect to the body member, and sealing means comprising a deformable O-ring of elastomeric material fitted in the smaller recess and sealingly engaging the plate member and the shank of the contactor and being of width in deformed and sealing relation to said plate member and said shank approximating the distance between said inner walls of the body member.

14. In a contactor assembly comprising an insulating body member having a transverse opening and two spaced annular inner walls in said opening cooperating to define an inner recess and an enlarged diameter outer recess surrounding one end of said transverse opening, and a contactor element extending through said opening and bearing against said body and spaced from said inner walls, the combination of a deformable sealing ring disposed in said inner recess and sealingly engaging the body member and the contact member, said deformable sealing ring being in deformed condition of width substantially no greater than the distance between said annular inner walls, and means for retaining said ring in said inner recess in sealing engagement with the body member and the contactor member including a washer carried by said contactor member for motion therewith relative to said body member to engage the sealing ring in said inner recess, said washer having a substantially plane radial surface opposed to the said sealing ring for retaining engagement therewith and having an outside diameter greater than the diameter of the inner recess and less than that of the outer recess.

15. A connector having an outer casing comprising two elongated annular body members of resilient, insulating material, each member having an inner and an outer end, the members having complementary surfaces at the inner ends thereof disposed generally in a plane normal to the longitudinal axis of the members for joining the members, and each member having an inner annular abutment portion on the inner side thereof and spaced from the inner end of the member, a disc-like member of insulating material mounted within each body member, a plurality of male and longitudinally-slotted tubular female members mounted on the said disc-like member and cooperatively disposed for insertion and withdrawal, the female members each having a tine provided with a lug projecting into said female member for firm engagement with a male member disposed therein, the disc-like members having tapered wall portions for sealingly engaging said inner annular abutment portions of the body members, cylindrical shield members surrounding the contactors, the length of the cylindrical shield members surrounding the contactors being related to the position of the abutment portions of the body member so that compressive engagement of the complementary surfaces of the body members urges the disc member into firm engagement with the inner annular abutment portion of the body member, and connecting means for securing the two body members with the inner ends thereof in compressive axial engagement comprising clamping means associated with one body member and means associated with the remaining body member adapted to be engaged by the clamping means and means imbedded in each of the body members at the innr ends thereof and cooperating with the clamping means to exert compressive forces uniformly about the entire periphery of the body members.

16. The invention in accordance with claim 3 and including an annular piece of resilient material integral with the abutment portion and compressed against the axially tapered outer portion of the support member by the inner annular abutment portion of the body member.

References Cited in the file of this patent

UNITED STATES PATENTS

| | | |
|---|---|---|
| 1,101,939 | Knauff | June 30, 1914 |
| 1,902,236 | Heintz | Mar. 21, 1933 |
| 2,015,418 | Wermine | Sept. 24, 1935 |
| 2,032,780 | White | Mar. 3, 1936 |
| 2,127,544 | Von Holtz | Aug. 23, 1938 |
| 2,284,945 | Chandler | June 2, 1942 |
| 2,291,793 | Chandler | Aug. 4, 1942 |
| 2,337,618 | Miller | Dec. 28, 1943 |
| 2,379,942 | Webber | July 10, 1945 |
| 2,383,926 | White | Aug. 28, 1945 |
| 2,404,682 | Baker | July 23, 1946 |
| 2,440,279 | Larkins, Jr. | Apr. 27, 1948 |
| 2,532,538 | Burtt et al. | Dec. 5, 1950 |
| 2,563,713 | Frei et al. | Aug. 7, 1951 |

FOREIGN PATENTS

| | | |
|---|---|---|
| 589,173 | Germany | Dec. 6, 1933 |
| 695,256 | France | Dec. 13, 1930 |